(12) United States Patent
Dao et al.

(10) Patent No.: US 12,237,531 B2
(45) Date of Patent: *Feb. 25, 2025

(54) BATTERY VENT SYSTEM

(71) Applicant: PROTERRA POWERED LLC, Burlingame, CA (US)

(72) Inventors: Duybao Dao, Milpitas, CA (US); Nicholas H. Herron, Pacifica, CA (US); Derek R. Paul, Redwood City, CA (US)

(73) Assignee: PROTERRA POWERED LLC, Burlingame, CA (US)

( * ) Notice: Subject to any disclaimer, the term of this patent is extended or adjusted under 35 U.S.C. 154(b) by 393 days.

This patent is subject to a terminal disclaimer.

(21) Appl. No.: 17/664,291

(22) Filed: May 20, 2022

(65) Prior Publication Data

US 2022/0352594 A1 Nov. 3, 2022

Related U.S. Application Data

(63) Continuation of application No. 16/713,042, filed on Dec. 13, 2019, now Pat. No. 11,374,284.

(51) Int. Cl.
*H01M 50/325* (2021.01)
*H01M 50/20* (2021.01)
*H01M 50/204* (2021.01)
*H01M 50/342* (2021.01)
*H01M 50/375* (2021.01)

(52) U.S. Cl.
CPC ......... *H01M 50/325* (2021.01); *H01M 50/20* (2021.01); *H01M 50/204* (2021.01); *H01M 50/3425* (2021.01); *H01M 50/375* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 6,143,483 A | 11/2000 | Ikeda | |
| 8,453,773 B2 | 6/2013 | Hill et al. | |
| 11,374,284 B2 * | 6/2022 | Dao | H01M 50/20 |
| 2006/0078787 A1 | 4/2006 | Sato et al. | |
| 2011/0020675 A1 | 1/2011 | Pei | |
| 2012/0231306 A1 | 9/2012 | Herron | |
| 2016/0036025 A1 | 2/2016 | Hofer | |
| 2017/0117516 A1 | 4/2017 | Jung | |

(Continued)

FOREIGN PATENT DOCUMENTS

| | | |
|---|---|---|
| CN | 201508864 | 6/2010 |
| CN | 207116559 | 3/2018 |
| CN | 109326759 | 2/2019 |

(Continued)

*Primary Examiner* — Alix E Eggerding
(74) *Attorney, Agent, or Firm* — SNELL & WILMER L.L.P.

(57) ABSTRACT

A battery pack includes an outer housing including a plurality of walls, at least one battery cell enclosed within the plurality of walls, a vent system disposed in at least one of the plurality of walls, and a disk provided between the cover and the valve. The vent system includes a carrier plate, an annular ring extending from the carrier plate and defining a lumen, a valve disposed in the lumen, and a cover attached to the carrier plate.

19 Claims, 4 Drawing Sheets

(56) References Cited

U.S. PATENT DOCUMENTS

2021/0050573 A1    2/2021  Lee
2022/0123429 A1*   4/2022  Yoo .................... H01M 50/375

FOREIGN PATENT DOCUMENTS

DE    102011109243    2/2013
DE    102016112664    1/2017
DE    102017214754    2/2019

* cited by examiner

BATTERY VENT SYSTEM

TECHNICAL FIELD

Embodiments of this disclosure relate to methods and systems for batteries, and more particularly to systems for venting batteries.

BACKGROUND

Batteries are used in many applications, including, for example in an electric vehicle, or a hybrid vehicle operating in the electric mode. The battery provides power to drive a motor and/or other electrical components. In some battery systems, multiple electrically connected batteries (or battery cells) are positioned in a battery module or a battery pack. During use, a phenomena known as thermal runaway can cause conditions that further increases a temperature and pressure within the battery and the battery pack. These high pressure and temperature conditions can cause malfunction and/or destruction of the battery pack. The current disclosure discloses systems for improved venting of the battery pack. The scope of the current disclosure, however, is defined by the attached claims, and not by the ability to solve any specific problem.

SUMMARY

Embodiments of the present disclosure relate to, among other things, systems and methods for venting a battery pack. Each of the embodiments disclosed herein may include one or more of the features described in connection with any of the other disclosed embodiments.

In one embodiment, a battery pack is disclosed. The battery pack may include an outer housing including a plurality of walls, at least one battery cell enclosed within the plurality of walls, and a vent system disposed in at least one of the plurality of walls. The vent system may include a carrier plate, an annular ring extending from the carrier plate and defining a lumen, a cover over the valve which is attached to the carrier plate, and a compressible disc between valve and the cover.

In another embodiment, a vent system for a battery is disclosed. The vent system may include a carrier plate having at least one opening, an annular ring extending from the at least one opening and defining a lumen, a seal surrounding the at least one opening, a valve disposed in the lumen, a cover attached to the carrier plate, a disk provided between the cover and the valve, a plurality of spokes, where each of the plurality of spokes may extend from a wall of the annular ring toward a central axis of the annular ring, and an inner ring coaxial with the annular ring and connected to each of the plurality of spokes.

In yet another embodiment, a vent system for a battery is disclosed. The vent system may include a carrier plate having two or more openings, a first annular ring extending from a first opening from the two or more openings and defining a first lumen, a second annular ring extending from a second opening from the two or more openings and defining a second lumen, a first seal surrounding the first annular ring and a second seal surrounding the second annular, a valve disposed in the first lumen, a first cover including at least one through hole attached to the carrier plate, the at least one through hole fluidly coupled to the first opening, a second cover covering the second opening, and a disk provided between the first cover and the valve.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

Unless defined otherwise, all terms of art, notations and other scientific terms or terminology used herein have the same meaning as is commonly understood by one of ordinary skill in the art to which this disclosure belongs. All patents, applications, published applications and other publications referred to herein are incorporated by reference in their entirety. If a definition set forth in this disclosure is contrary to, or otherwise inconsistent with, a definition in these references, the definition set forth in this disclosure prevails over the definitions that are incorporated herein by reference. None of the references described or referenced herein is admitted to be prior art to the current disclosure.

The present disclosure describes systems and methods for venting battery packs. While principles of the current disclosure are described with reference to a battery pack for electric vehicles, it should be understood that the disclosure is not limited thereto. Rather, the systems and methods of the present disclosure may be used in any battery pack or device generating thermal energy. As used herein, the term "battery pack" includes any energy-storage device or energy-generating device (e.g., a battery, a power unit, a power cell, etc.). In this disclosure, relative terms such as "about," "substantially," etc. is used to indicate a possible variation of ±10% in a stated or implied numeric value.

Figure 1:
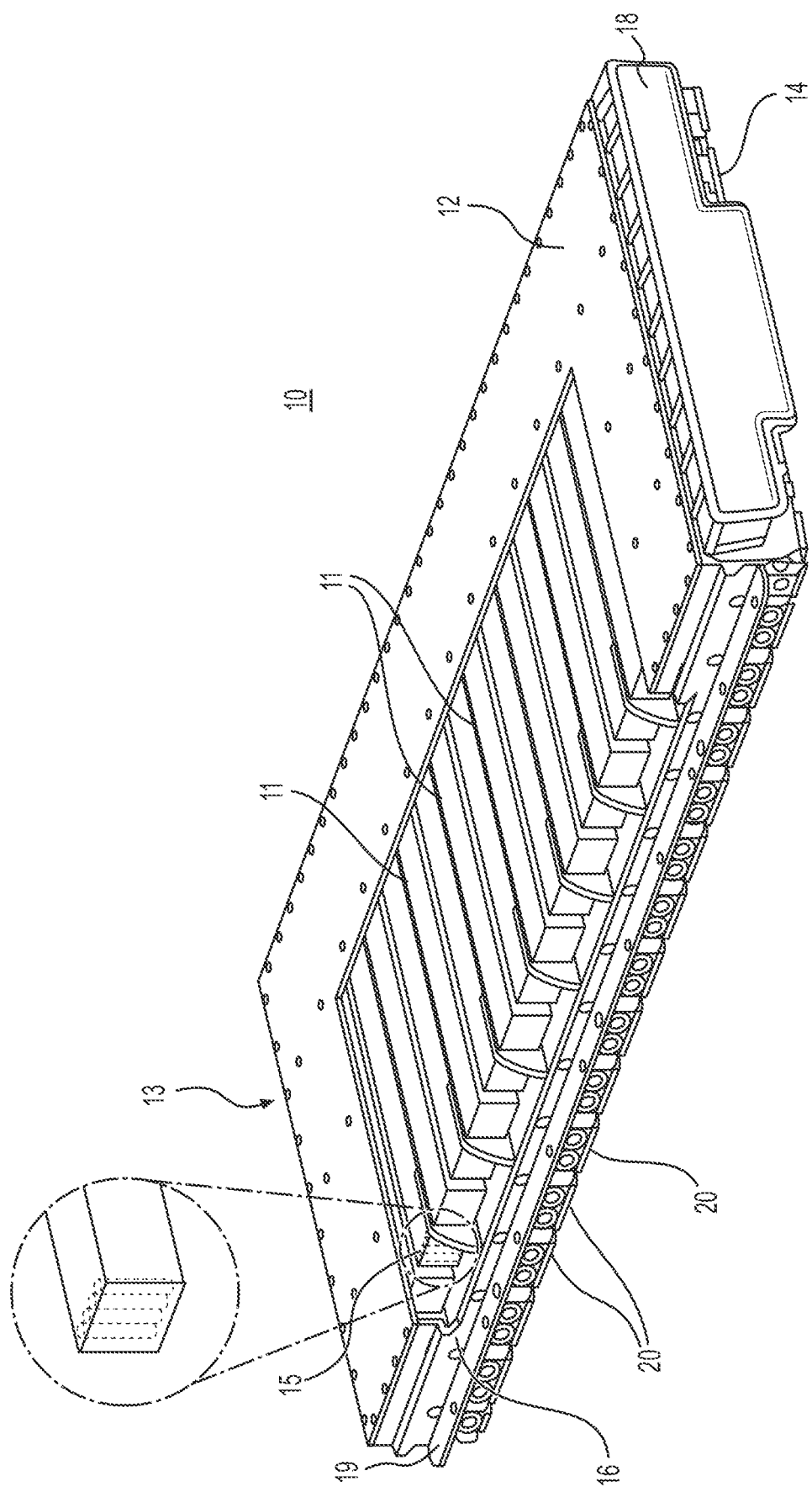
FIG. 1 is a perspective view of an example battery, with a cutaway illustrating internal features of the battery.

FIG. 1 illustrates a battery pack 10 used in, e.g., an electric vehicle. According to an embodiment, battery pack 10 is formed of one or more battery modules 11 electrically connected together in series or in parallel. Each battery module 11 typically includes multiple battery cells 15 electrically connected together in series or in parallel. Any type of battery cell 15 (cylindrical, prismatic, etc.) having any chemistry (e.g., lithium titanate oxide (LTO), nickel manganese cobalt (NMC), etc.) may be used in battery module 11 and battery pack 10. Some of the possible battery chemistries and arrangements of battery pack 10 are described in commonly assigned U.S. Pat. No. 8,453,773 and U.S. Provisional Patent Application No. 62/906,931 filed on Sep. 27, 2019, each of which is incorporated herein by reference in its entirety.

With continued reference to FIG. 1, battery pack 10 includes a housing 13 having top and bottom walls 12, 14, sidewalls 16 (only one sidewall is labeled in FIG. 1), a front wall 18, and a rear wall (not shown), which enclose battery modules 11 (a cutaway view of battery pack 10 is shown in FIG. 1.) Top wall 12, bottom wall 14, sidewalls 16, front wall 18, and the rear wall may be formed of any material, including but not limited to metal, plastic, ceramic, or the like. While shown as a generally rectangular shape, housing 13 may be any shape suitable for enclosing battery modules 11 and use in supplying electric power, for e.g., in electric vehicles or the like. For example, as shown in FIG. 1, front wall 18 is a polygon, and the shape of housing 13 may allow for stacking of multiple battery packs 10, and/or may allow battery pack 10 to cooperate with a corresponding structure on, e.g., an electric vehicle or the like.

As further shown in FIG. 1, a protrusion 19 extends perpendicularly from sidewall 16. Protrusion 19 includes a plurality of throughholes that may receive bolts, rivets, or other fastening devices to fasten battery pack 10 to a structure to maintain a position of battery pack 10 and prevent movement of battery pack 10 during use. For example, one or more throughholes of protrusion 19 may match up with one or more throughholes in a corresponding support structure, and a bolt and a nut system, or a rivet or the like, may be used to connect protrusion 19 to the support structure. It will be understood that protrusion 19 is not limited to being perpendicular to sidewall 19, and may be at any suitable angle for interacting with a corresponding structure to which battery pack 10 is fastened. In some embodiments, multiple battery packs 10 may be electrically connected together in series or in parallel and attached under the floor of an electric bus or another electric vehicle (electric truck, electric heavy duty vehicle, electric car, etc.)

As explained previously, battery pack 10 includes multiple battery cells 15 electrically connected together. It is known that, in some cases, a defect in a battery cell 15 may cause uncontrolled internal heating and resulting pressure increase within the casing of battery cell 15. Battery cells 15 typically include an internal short circuit protection mechanism (e.g., a current interrupt device (CID)). The CID is typically employed to provide protection against uncontrolled internal heating in the battery cell 15 by interrupting the current path from the battery cell 15 when the temperature inside its casing is greater than a predetermined value. The CID typically includes first and second conductive plates in electrical communication with each other. The first and second conductive plates are, in turn, in electrical communication with an electrode and a terminal of the battery cell, respectively. The second conductive plate separates from (e.g., deforms away or is detached from) the first conductive plate of the CID when the temperature inside the battery cell 15 is greater than a predetermined value, whereby a current flow between the electrode and the terminal is interrupted. Vent system 20 allows the high pressure gases from inside the casing of the battery cell 15 to vent or escape to the outside (e.g., into housing 13 of battery pack 10). With continued reference to FIG. 1, a plurality of vent systems 20 are disposed in sidewalls 16 of battery pack 10 below protrusion 19, adjacent bottom wall 14. Vent system 20 provide venting to an internal portion of battery pack 10 surrounded by housing 13, e.g., for each battery module 11. It will be understood that the placement of vent systems 20 is not limited to that shown in FIG. 1, and vent systems 20 may be placed in top wall 12, in bottom wall 14, in sidewalls 16, in front wall 18, and/or in the back wall. It should be noted that although a vent system 20 on housing 13 of battery pack 10 is discussed herein, this is only exemplary. In general, vent system 20 may be positioned on any housing that encloses or includes one or more battery cells 15. For example, in some embodiments, vent system 20 may be positioned on the housing of some or all battery modules 11 of battery pack 10. It is also contemplated that, in some embodiments, vent system 20 may be incorporated in the casing of a battery cell 15.

Figure 2A:
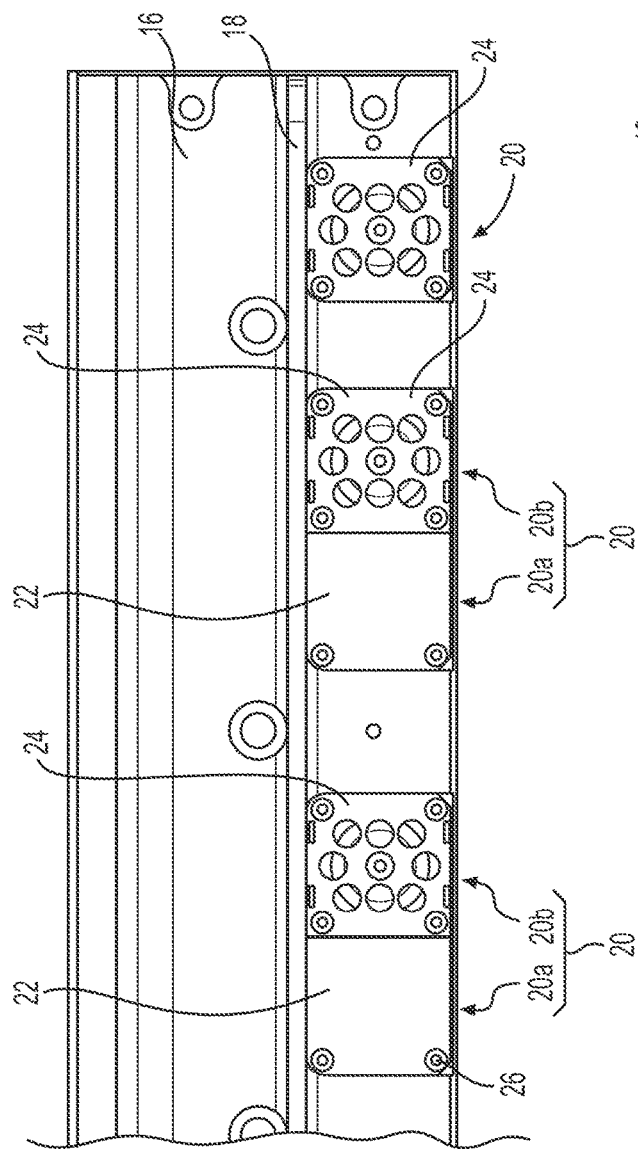
FIGS. 2A and 2B are a schematic views of a side of the battery of FIG. 1.
Figure 2B:
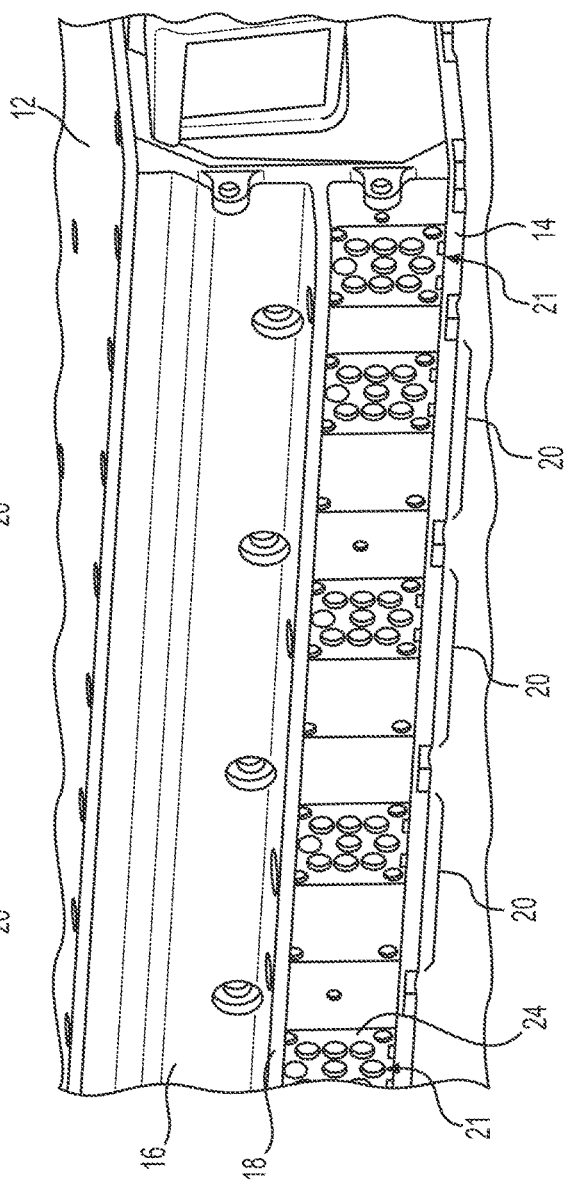

FIGS. 2A and 2B provide perspective views of battery pack 10 and provide a close-up view of vent systems 20. As shown in FIGS. 2A and 2B, vent systems 20 may include a single vent 21, having an outer perimeter defined by a cover plate 24. Alternatively, vent systems 20 may include a first side 20a having a hole, which is covered by a plate 22, and a second side 20b having a hole through which vent 21 extends, covered by cover plate 24 of vent 21 covering side 20b. It will be understood that these configurations are merely examples, and vent systems 20 may include multiple vents 21 and/or multiple plates 22 depending on a cross-section of a hole in housing 13. For example, to optimize a cross sectional area of the opening, multiple holes may be included in a carrier plate 28 (see FIG. 3), with a vent 21 associated with one of the holes, while the remaining holes may be covered by plate 22.

Figure 3A:
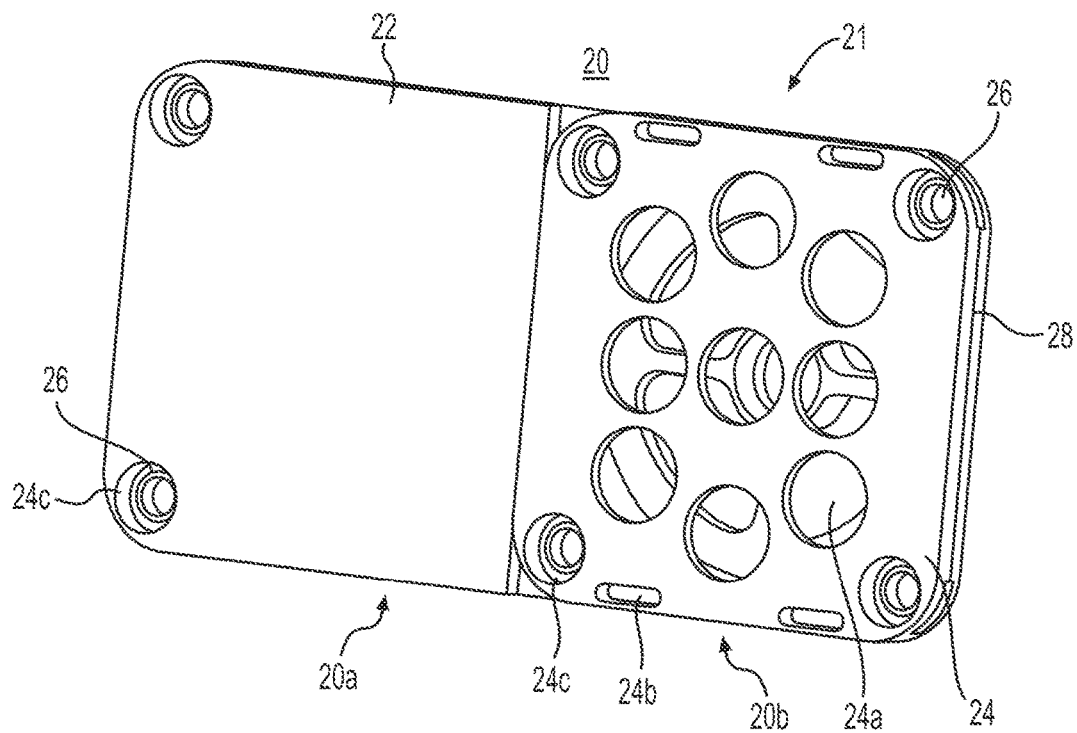
FIGS. 3A and 3B are schematic views of a front and a back, respectively, of a vent system for use in the battery of FIG. 1.
Figure 3B:
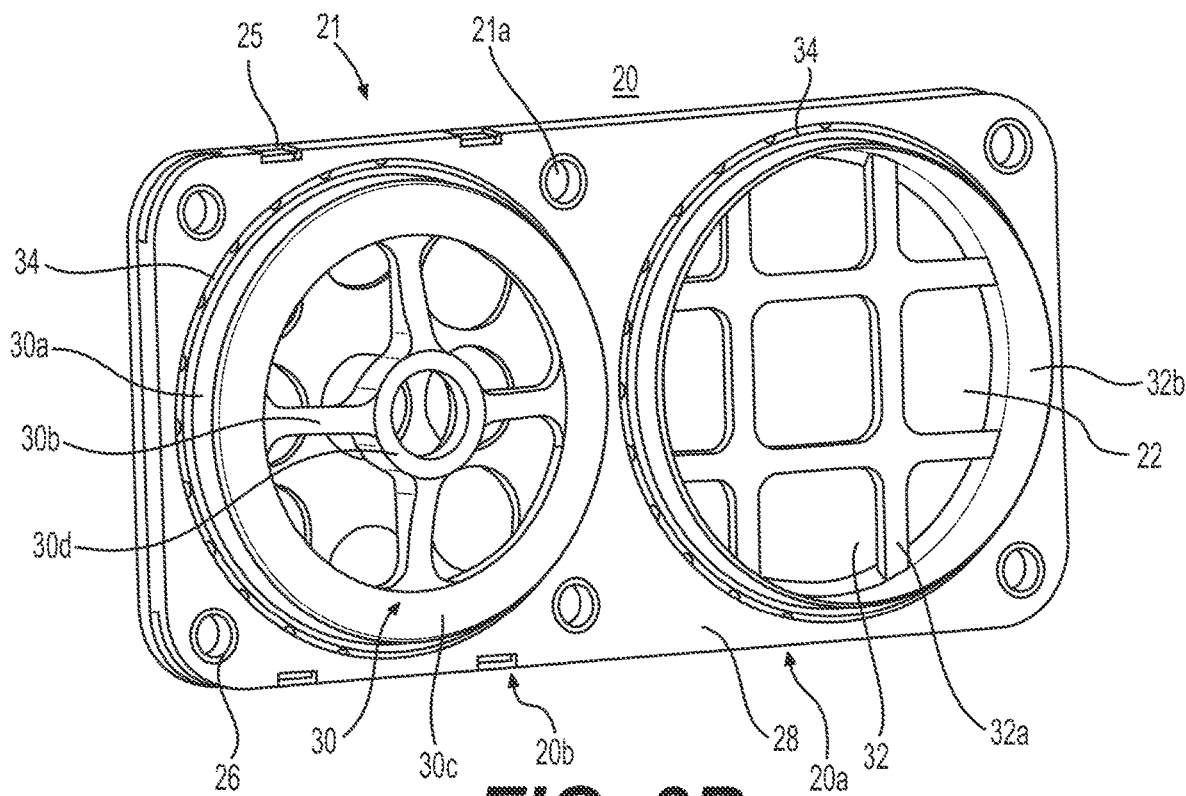

FIGS. 3A and 3B illustrate perspective views of a front and a rear, respectively, of vent system 20. The front of vent system 20 faces an exterior of battery pack 10, for example, as shown in FIGS. 1, 2A, and 2B. The rear of vent system 20 faces an interior of battery pack 10, and faces one or more battery modules 11 and any additional internal structures of battery pack 10. For ease of understanding, FIGS. 3A and 3B illustrate a first side and a back side (e.g., a first side and a second side) 20a, 20b of vent system 20, but, as described herein, vent system 20 may have any configuration.

Referring to FIG. 3A, vent system 20 includes first side 20a and second side 20b. First side 20a is comprised of a wall 22 (e.g., a solid plastic wall), thereby closing off a hole in enclosure member 16. As shown in FIG. 3B, the rear of vent system 20 on first side 20a may include one or more ribs 32a provided across the opening defined by annular ring 32b to increase stiffness and robustness of wall 22 to prevent punctures or ruptures from external impacts. Wall 22 may close off one or more openings in enclosure member 16 to allow for venting of greater pressures and flow rates as needed to maintain internal structural integrity With continued reference to FIGS. 3A and 3B, vent 21 is provided on second side 20b. Vent 21 includes cover plate 24 on the front side of vent system 20. Cover plate 24 includes a plurality of holes 24a. Holes 24a are arranged with one hole 24a provided in a center of cover plate 24 and a plurality of holes 24a arranged around central hole 24a. It will be understood, however, that holes 24a are not limited to this configuration, and may be arranged in any manner, such as a rectangular shape or the like. Holes 24a connect the exterior of battery pack 10 to an umbrella valve 36 (see FIG. 4), as will be explained in greater detail herein. Cover plate 24 further includes rectangular holes 24b at top and bottom edges thereof. Holes 24b may be formed from a formation of clips 25, which may allow cover plate 24 to be snap-fit to carrier plate 28. In addition, a plurality of mounting holes 24c are provided in the corners of cover plate 24 and plate 22. Mounting holes 24c may receive mounting hardware to fasten cover plate 24 to carrier plate 28. The mounting hardware may include compression limiters 26, rivets, expandable washers, bolts, screws, or the like. Additionally, or alternatively, cover plate 24 may be attached to carrier plate 28 using adhesive or any other attachment mechanism. In addition, carrier plate 28 may include holes 21a to receive and/or cooperate with the mounting hardware for attaching vent system 20 to housing 13 of battery pack 10.

As shown in FIG. 3B, vent 21 includes a receiver 30 which receives umbrella valve 36, as will be explained in greater detail herein. Receiver 30 may have a size and a shape similar to a size and a shape of umbrella valve 36. As shown in FIG. 3B, receiver 30 includes an annular ring 30a extending perpendicularly from carrier plate 28. An end wall 30c, which defines an opening, is connected to an end of annular ring 30a opposite carrier plate 28. A first end of each of a plurality of spokes 30b extend from end wall 30c towards a central axis of annular ring 30a. Spokes 30b are each connected at opposite ends to a central annular ring 30d, the outer wall of which having a diameter less than an inner wall of annular ring 30a. A seal 34 is also provided around an outer wall of each of annular ring 30a and annular ring 32b. As will be described in greater detail, seal 34 forms a seal between carrier plate 28 and battery pack 10 when vent system 20 is mounted on battery pack 10.

Figure 4:
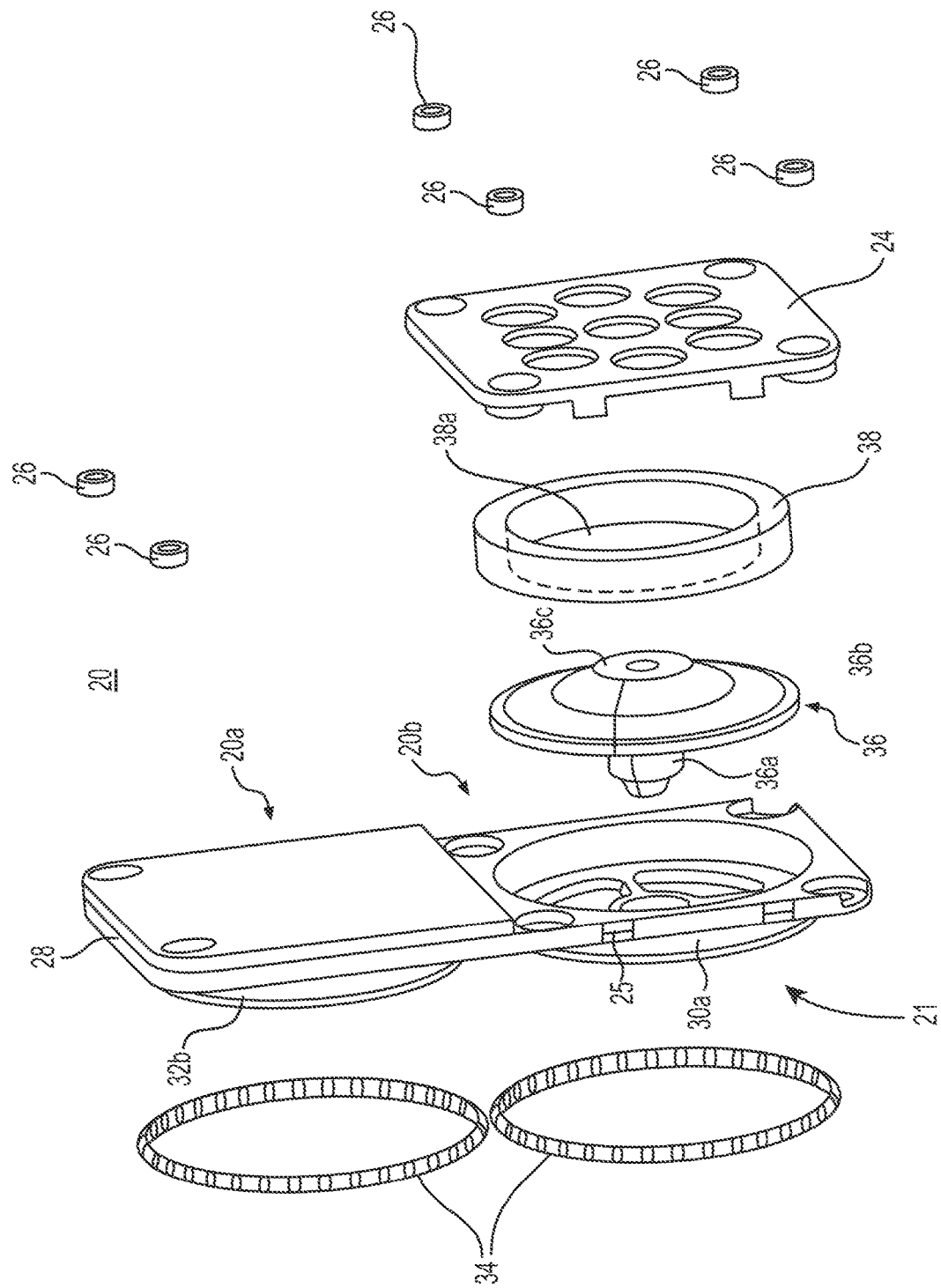
FIG. 4 is an exploded view of the vent system of FIGS. 3A and 3B.

FIG. 4 illustrates an exploded view of vent system 20. As discussed above, seals 34 are provided on the rear side of vent system 20 and surround each of annular ring 30a and annular ring 32b. Umbrella valve 36 has an umbrella, or mushroom, shape, and includes a central protrusion 36a on a first side of and extending from a body 36b. As shown in FIG. 4, an end of central protrusion 36a distal of body 36b tapers away from body 36b. Body 36b is a diaphragm, which can include a concave surface facing central protrusion 36a, with a flat surface 36c on an opposite side of the concave surface. As further shown in FIG. 4, a disc 38 including a central hole 38a is provided between valve 36 and cover plate 24. As will be described herein, disc 38 may be attached to cover plate 24 by, e.g., an adhesive or the like.

An arrangement of vent system 20 will now be described with reference to FIG. 4. According to an example, seals 34 surround annular rings 30a and 32b. When vent system 28 is affixed to housing 13, a seal is created between housing 13 and carrier plate 28 (see, e.g., FIG. 2B). With continued reference to FIG. 4, valve 36 is inserted into a lumen of vent 21 created by annular ring 30a such that central protrusion 36a extends into and through annular ring 30d, allowing body 36b to rest against spokes 30b and end wall 30c. As described above, disc 38 may be attached by, e.g., adhesive, to a surface of cover plate 24, such that attaching cover plate 24 to carrier plate 28 causes disc 38 to enter the lumen of vent 21 and compress valve 36. Alternatively, disk 38 may not be attached to cover plate 24, and disk 38 may be inserted into the lumen of vent 21. Subsequently, cover plate 24 may be attached to carrier plate 28, thereby compressing disk 38 against valve 36. As is known to a person skilled in the art, the pressure at which umbrella valve 36 first opens to allow a fluid (e.g., high pressure gases from inside housing 13) to flow through is known as the crack pressure of valve 36. The compression of disk 38 against valve 36 increases the crack pressure of valve 36. A higher crack pressure allows housing 13 to be tested under greater pressures, e.g., approximately 7 kPa, which increases the signal to noise ratio during testing and thereby reducing testing time and cost. Additionally, disk 38 compresses an outer edge of valve 36 against end wall 30c, which reduces the likelihood valve 36 will open under pressure and contaminate an interior of housing 13 and/or from allowing contaminates from building up between valve 36 and end wall 30c. Further, cover plate 24 prevents valve 36 from being ejected from vent 21 during pressure spikes during thermal runaway.

According to an example, carrier plate 28 is formed of a plastic or a resin, e.g., nylon, polycarbonate, acetal, or the like, and may be polished to approximately 0.2 microns Ra on the sealing surfaces. The plastic construction of carrier plate 28 provides improved corrosion protection compared to metals. The polishing of the plastic or the resin is more cost efficient than polishing a similarly sized and shaped machined metal carrier plate. Further, the polishing provides a sufficient sealing surface for valve 36 against spokes 30b and end wall 30c, which improves crack pressure, as discussed above, preventing contamination of and preventing moisture from entering housing 13, and preventing contamination between valve 36 and end wall 30c. In addition, utilizing a plastic or a resin carrier plate 28 as opposed to a metal carrier plate, such as aluminum, significantly improves the cost of materials and production time. Further, vent systems 20 which are sealed using solid, elastomeric seals are more easily replaced than vent systems attached and sealed using adhesive sealants.

Incorporating vent system 20 having a greater crack pressure provides sufficient venting for battery pack 10, thereby reducing the number of vents 21 and, thus, the number of umbrella valves 36. Vent systems 20 also reduce the number of umbrella valves 36 while also providing plastic carrier plate 28 that melts to provide the required venting for the later stages of thermal runaway events. A reduction in vents 21 for each battery pack 10 reduces the number of potential leak paths, thereby decreasing the amount of oxygen into battery pack 10. This oxygen reduction decreases the flammability of the effluent inside battery pack 10, which decreases the propagation rate and decreases the amount of heat produced in battery pack 10. In addition, in the event of thermal runaway progression, exhaust flow and temperature within battery pack 10 increases, thereby heating spokes 30b. According to an example, if the temperature within battery pack 10 increases above a threshold of approximately 250 degrees Celsius, spoke 30b will melt out. This melt out exposes multiple holes in member 16, that were previously covered by vent system 20, allowing the interior of battery pack 10 to vent larger volumes of gas. This improved venting prevents gasses from spreading to neighboring battery modules 11.

According to an example, valve 36 may be formed of a rubber, a synthetic rubber, or any other pliable material suitable for sealing. Disk 38 may be formed of foam or another rigid or semi rigid material that may supply a sufficient force against valve 36. Cover plate 24 is also formed of a plastic or a resin, and may be the same or different material as carrier plate 28. It will be understood that portions of carrier plate 28 may be different materials. For example, an outer surface of carrier plate 28 may be a first material, e.g., plastic or resin, and another portion of carrier plate 28, such as spokes 30b, may be a different material, e.g., a different plastic or resin.

While principles of the present disclosure are described herein with reference to venting a battery pack, it should be understood that the disclosure is not limited thereto. Rather, the systems and methods described herein may be employed to vent any housing enclosing one or more battery cells (e.g., battery module 11, etc.). The disclosed systems and methods may more generally used to vent any fuel system or heat generating member. Also, those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A method for venting a battery pack, the battery pack comprising an outer housing with a plurality of walls, a plurality of battery modules within the plurality of walls, and a vent system disposed in at least one of the plurality of walls, the vent system comprising a carrier plate made of a plastic or a resin, a first annular ring forming a part of the carrier plate, a valve disposed in a lumen of the first annular ring, a cover attached to the carrier plate, and a plurality of spokes extending from a wall of the first annular ring toward a central axis of the annular ring, the method comprising:
   upon a temperature within the battery pack increasing above a first melting point, melting one or more of the plurality of spokes thereby enlarging a venting area of the outer housing; and then
   melting portions of the carrier plate other than the plurality spokes in a later stage of one or more thermal runaway events at a second melting point different from the first melting point.

2. The method of claim 1, further comprising:
   venting, by the vent system, high pressure gases to outside from inside the outer housing through a hole of outer housing in at least one of the plurality of walls.

3. The method of claim 1, further comprising:
   preventing, by the cover, the valve from being ejected from the vent system during pressure spikes during a thermal runaway event.

4. The method of claim 1, wherein melting portions of the carrier plate other than the plurality of spokes comprises melting during one or more later stages of thermal runaway.

5. The method of claim 1, wherein an inner ring is connected to the plurality of spokes and comprises a material having the first melting point, the method further comprising: melting the inner ring during melting of the plurality of spokes.

6. The method of claim 1, further comprising:
   covering, by a plate, a second hole of a second side of the carrier plate.

7. The method of claim 1, wherein the plastic includes one or more of nylon, polycarbonate, or acetal.

8. The method of claim 1, wherein the valve is umbrella shaped and comprises a base with a concave surface in a resting position and a protrusion extending from the concave surface of the base, wherein a distal end of the protrusion is tapered away from the base.

9. The method of claim 8, wherein the valve is formed of a rubber or a synthetic rubber, the method further comprising:
   opening the valve at a pressure of approximately 7 kPa.

10. The method of claim 9, wherein the concave surface of the valve is oriented facing the plurality of spokes and a disk of the vent system is between the cover and the valve, the method comprising:
    applying, by the disk, a force against the valve when the cover is attached to the carrier plate.

11. The method of claim 10, further comprising increasing a crack pressure of the valve by pressing the disk against the valve.

12. The method of claim 1, wherein at least one through-hole of the cover is in fluid communication with the lumen and an exterior of the outer housing.

13. A method of decreasing oxygen into a battery pack, the battery pack comprising an outer housing with a plurality of walls comprising a venting hole, at least one battery cell within the plurality of walls, and a vent system in fluid communication with the venting hole and disposed in at least one of the plurality of walls, the vent system comprising a carrier plate, a first annular ring forming a part of the carrier plate, a valve disposed in a lumen of the first annular ring, and a plurality of spokes extending from a wall of the first annular ring toward a central axis, the method comprising:
    melting the plurality of spokes thereby exposing one or more holes in the at least one of the plurality of walls while remaining in fluid communication with the venting hole upon a temperature within the battery pack increasing during thermal runaway above a first melting point.

14. The method of claim 13, further comprising:
    venting, by the vent system, high pressure gases to outside from inside the outer housing through the venting hole in the at least one of the plurality of walls.

15. The method of claim 14, further comprising:
    preventing, by a cover attached to the carrier plate, the valve from being ejected from the vent system during pressure spikes of thermal runaway.

16. The method of claim 15, further comprising:
    opening the valve at a pressure of approximately 7 kPa.

17. The method of claim 16, further comprising:
    melting portions of the carrier plate other than the plurality spokes during later stages of thermal runaway at a second melting point different from the first melting point.

18. The method of claim 17, further comprising:
    applying, by a disk between the cover and the valve, a force against the valve when the cover is attached to the carrier plate; and
    increasing, by applying the disk against the valve, a crack pressure of the valve.

19. The method of claim 14, wherein an inner ring is connected to the plurality of spokes and comprises a material having the first melting point, the method further comprising: melting the inner ring during melting of the plurality of spokes.

* * * * *